United States Patent

Hahn et al.

(10) Patent No.: US 6,564,123 B2
(45) Date of Patent: May 13, 2003

(54) PROCESS AND DEVICE FOR MOVING A MOTOR VEHICLE INTO A TARGET POSITION

(75) Inventors: Stefan Hahn, Ulm/Donau (DE); Uwe Regensburger, Ostfildern (DE); Erwin Schmid, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/117,331

(22) Filed: Apr. 8, 2002

(65) Prior Publication Data

US 2003/0004613 A1 Jan. 2, 2003

(30) Foreign Application Priority Data

Apr. 9, 2001 (DE) .......................................... 101 17 650

(51) Int. Cl.⁷ ................................................. G05D 1/00
(52) U.S. Cl. ................................. 701/1; 701/23; 701/36; 701/301
(58) Field of Search ........................... 701/1, 36, 2, 23, 701/28, 41, 67, 68, 70, 77, 78, 101, 301, 97, 213, 98, 300; 340/431, 435, 932

(56) References Cited

U.S. PATENT DOCUMENTS 6,233,506 B1 * 5/2001 Obradovich et al. ........... 701/1
6,301,530 B1 * 10/2001 Tamura ......................... 701/23
6,370,475 B1 * 4/2002 Breed et al. ................. 701/301
6,381,524 B1 * 4/2002 Kuragaki et al. ............. 701/36
6,405,132 B1 * 6/2002 Breed et al. ................. 701/301
6,446,998 B1 * 9/2002 Koenig et al. ............... 340/431

FOREIGN PATENT DOCUMENTS

JP          05-002422          8/1993

* cited by examiner

Primary Examiner—Richard M. Camby
(74) Attorney, Agent, or Firm—Crowell & Moring LLP

(57) ABSTRACT

A process for moving a motor vehicle into a target position includes placing the motor vehicle in a starting position near the target position; following a first driver-side activation, scanning the environment of the motor vehicle continuously at least for detection of the target position, and determining continuously the current motor vehicle position; determining control data for moving the motor vehicle into the target position with the aid of the determined environment and position information; and after a second driver-side activation, delivering control data-dependent control commands to at least one of a drive train, a brake system and a steering system of the motor vehicle, thus driving the motor vehicle driver-independently into the target position.

18 Claims, 2 Drawing Sheets

PROCESS AND DEVICE FOR MOVING A MOTOR VEHICLE INTO A TARGET POSITION

This application claims the priority of German Patent Document No. 101 17 650.3, filed Apr. 9, 2001, the disclosure of which is expressly incorporated by reference herein.

BACKGROUND AND SUMMARY OF THE INVENTION

The invention relates to a process and a device for moving a motor vehicle into a target position.

Motor vehicles are conventionally controlled by drivers sitting in the driver's seat. If a motor vehicle, which is parked in a narrow parking space, has to be moved into another parking position, it is necessary for a driver to get into the vehicle in order to drive it into the desired other position. However, getting comfortably into the entrance side of the motor vehicle is often not possible or possible only with difficulty due to another parked motor vehicle.

The same problem arises when, after parking, the vehicle driver or a passenger of the motor vehicle wants to leave again. In garages, multi-story parking garages, parking lots and the public streets, the doors of a vehicle often cannot be opened wide enough, due to narrow parking conditions, in order for the passengers to get out comfortably. Therefore, passengers often get out of the vehicle before parking, a process that is impossible for the vehicle driver when performing a conventional parking operation. The same problem also arises in conjunction with pulling a parked vehicle out of narrow parking spaces, and the passengers do not get in until after the vehicle has been pulled out.

To facilitate the parking of motor vehicles, the use of an on-board parking assistant is known, such as the one described in the JP-A05002422. Such a parking assistant helps the vehicle driver with the parking operation by sending continuously calculated steering instructions to the vehicle driver. If the driver of the vehicle carries out these instructions, he can maneuver the vehicle safely into a planned parking space. In addition, the parking assistant measures continuously with its measurement system the instantaneous position and the setting angle of the vehicle in relation to the parking space. From these measurement values an on-board computer generates continuously the steering instructions for the vehicle driver.

With such a device, however, it is not possible for the driver, who must park the vehicle in accordance with the steering instructions while sitting in the vehicle, to get out of the vehicle comfortably in a narrow parking space, for example, when parking in the lengthwise direction of the vehicle. A simple "unparking" or maneuvering of the motor vehicle is not possible with such a device.

Thus, the object of the invention is to provide a process and a device for controlling a motor vehicle that makes it possible to park or drive the motor vehicle in a comfortable manner even under unfavorable parking conditions. In addition, the motor vehicle driver and/or the passengers can always get in and out comfortably.

According to one aspect of the present invention, a process for moving a motor vehicle into a target position includes putting the motor vehicle into a starting position close to the desired target position. Following a first driver-side activation, the environment of the motor vehicle is scanned continuously at least for detection of the target position, and the current motor vehicle position is determined continuously. With the aid of the determined environment and position information, control data for moving the motor vehicle into the target position are found. After a second driver-side activation, control data-dependent control commands are delivered to the drive train, the brake system and/or the steering of the motor vehicle, thus allowing the motor vehicle to be automatically driven into the target position.

According to a preferred embodiment of the present invention, the desired target position can be recognized by means of the determined environment and/or position data; and corresponding information is delivered to the driver.

According to another preferred embodiment, when an obstacle for the parking operation is detected while scanning the environment of the motor vehicle and while determining the current motor vehicle position, warning information and/or information about the obstacle can be delivered to the driver, the second driver-side activation is blocked, and/or the driving operation into the target position is terminated or interrupted.

According to yet another embodiment, there can be a communications connection between the driver outside the motor vehicle and the motor vehicle. The connection sends to the motor vehicle at least a driver-side activation command or the similar control command and/or sends to the driver vehicle-side data.

According to yet another embodiment, the target position can be a parking space, a garage parking space or the like, which can be determined by the environment and position data that are found.

According to a further embodiment, the starting position can be a parking space, a garage parking space, or the like, and the target position can be a position outside the starting position.

In accordance with another aspect of the invention, a device for carrying out the aforementioned process includes an environment sensing device, disposed on the motor vehicle, for detecting continuously the environment of the motor vehicle and the target position, a position sensing device, disposed on the motor vehicle, for detecting continuously the position of the motor vehicle, and a first actuator, acting on the environment sensing device and the position sensing device, for driver-side activation of the environment sensing device and the position sensing device. The device further includes a computer, connected to the environment sensing device and the position sensing device, for generating control data as a function of the environment and the vehicle position for the purpose of moving the motor vehicle into the target position, a controller, connected to the drive train, the brake system and/or the steering of the motor vehicle, for the purpose of influencing as a function of the control data the drive train, the brake system and/or the steering of the motor vehicle in such a manner that the motor vehicle drives into the target position independently of the driver, whereby a second actuator is in contact with the controller for driver-side activation of the controller.

According to another embodiment of the device, at least the first actuator can be disposed on the motor vehicle.

According to yet another embodiment, at least the second actuator can be disposed on a transmitter, which communicates with a receiver, connected to the controller.

According to still another embodiment, the environment sensing device and/or the position sensing device can exhibit a camera arrangement, a laser scanner arrangement, an ultrasonic sensor arrangement, a radar sensor arrangement, or the like.

According to a further embodiment, the position sensing device can exhibit a satellite-aided GPS position recognition for recognizing the start and target position and the current position.

According to a still further embodiment, an emergency terminating mechanism for driver-side termination or interruption of the driving operation into the target position can be disposed on the motor vehicle and/or the transmitter.

One embodiment is explained in detail below with reference to the drawings.

DETAILED DESCRIPTION OF THE DRAWINGS

Figure 1:
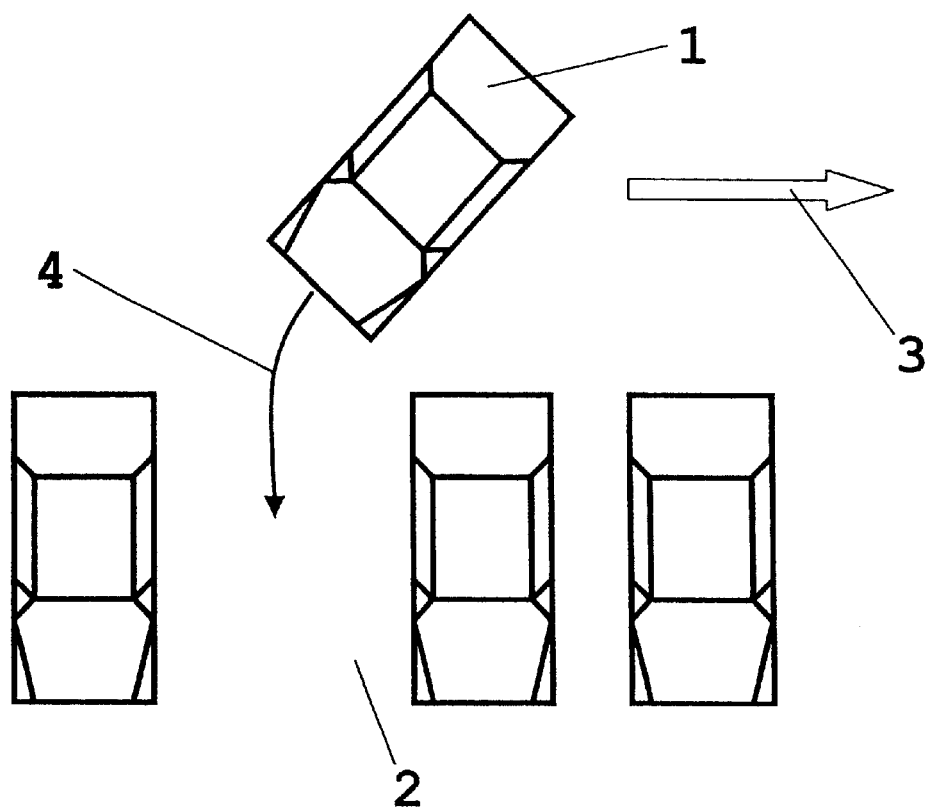
FIG. 1 shows a parking operation at right angles to the direction of travel.

In the parking operation depicted in FIG. 1, the driver pulls the vehicle 1 to be parked into a starting position in front of the selected parking space 2. The parking space 2 extends at right angles to the main direction of travel 3.

There is an optimal starting position for the parking operation for a vehicle, parked approximately in the middle and parallel to the longitudinal direction of the parking space. In this position there is no problem in opening the vehicle doors completely. The vehicle 1 can be parked in front of the parking space 2 with the front end or the rear end for forward or backward parking.

The inventive process also makes it possible to park even vehicles that start a parking operation from a less than optimal starting position. To this end, the parking and maneuvering device, depicted in FIG. 3, checks with the environment sensor system 5 the parking situation and signals whether the parking operation can be initiated or whether obstacles obstruct a parking operation.

Figure 3:
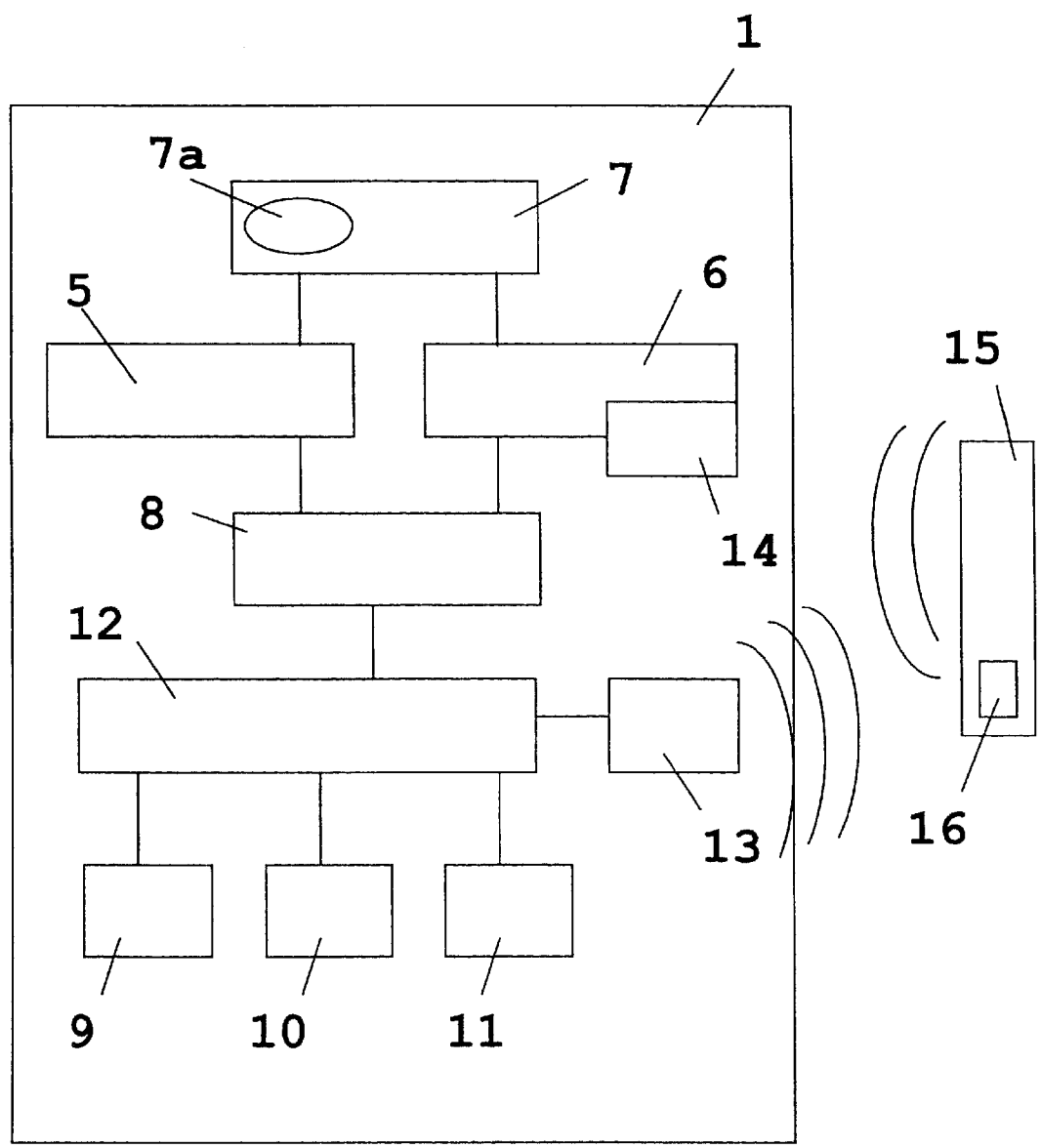
FIG. 3 depicts a device for carrying out the parking operation.

The vehicle driver, still located in the vehicle, activates by means of the actuator 7, depicted in FIG. 3, the parking and maneuvering device and obtains from the parking and maneuvering device by means of an output device 7a optical and/or acoustical information about whether the parking operation can be carried out. In addition, the environment of the vehicle, at least the area in front of or behind the vehicle, is analyzed by the parking and maneuvering device by means of suitable environment sensors 5, which generate, for example, 3D information about the environment. In so doing, it is checked in the internal computer 8 of the parking and maneuvering device whether a safe target trajectory 4, that is, a suitable, planned path of travel for the vehicle can be generated in order to start the parking operation.

If, after checking the parking situation, the parking and maneuvering device signals, owing to the perceived obstacles, no confirmation for carrying out a successful parking or maneuvering operation, then reference is made over the output device 7a to the cause for terminating the parking or maneuvering operation.

Optionally the possibility of opening the doors in the starting position can also be checked by the parking and maneuvering device when it checks the parking or maneuvering situation. A general error message or an error message relating to the respective door can be generated when the parking and maneuvering device recognizes that in the selected starting position one or more doors cannot be completely opened owing to space constraints.

If the parking and maneuvering device signals the possibility of carrying out the desired parking or maneuvering operation, then any passengers that are present and the vehicle driver can leave the vehicle. Prior to this signaling, the parking and maneuvering device has placed the vehicle into a safe state. In the embodiment the signaled state is reached, for example, by actuating the brake 10. For automatic transmissions it is not absolutely necessary to operate the parking brake or to shift into idling mode.

After the vehicle driver gets out, he starts the rest of the parking or maneuvering operation by means of a transmitter 15, which is integrated, for example, in the vehicle key and assumes preferably the function of the key. Instead of the transmitter, other suitable communications devices can also be used, for example, a mobile telephone with which the parking and maneuvering device starts the rest of the parking or maneuvering operation by means of a special numerical code and/or by voice input. Then the parking or maneuvering operation is carried out automatically by the parking and maneuvering device.

In addition, the computer 8 determines continuously by means of the environment sensor system 5 a local digital map of the environment of the vehicle. Thus, for example, the sensor system of the embodiment is designed as a laser scanner, which makes it possible to generate a 3D map of the environment of the vehicle. As an alternative, for example, several interacting lasers, a stereo image processing and range image cameras can be used for imaging the environment. Any type of environment sensor is suitable that detects the environment or the parking and maneuvering situation in a suitable manner.

The current vehicle position in this environment is calculated by the parking and maneuvering device from the measurement of the speed of the wheels, the steering and yawing angles and from the measurement of the distance to the objects in the environment. The desired trajectory 4, which is continuously updated, is calculated by the parking and maneuvering device from the current vehicle position, known in the generated map, and a target position, which can be determined from the map, in the parking space.

To travel the desired trajectory, the parking and maneuvering device generates with the aid of a controller 12 suitable control commands for the actuators in the vehicle, which act continuously on the steering 9 and the drive train 11. In so doing, to reach the target position a change between forward and backward drive can be induced automatically, and the requisite steering and braking maneuver can also be carried out.

To reach the target position, the vehicle is stopped automatically by the parking and maneuvering device. The brake 10 is operated; optionally the "P" position of an automatic drive is set; or for safety a drive gear is set and all units are shut off. The transmitter 15 signals the vehicle driver the successful completion of the parking or maneuvering operation.

The remote operation 15 of the embodiment is designed in such a manner that the automatic parking or maneuvering operation is maintained only as long as the vehicle driver maintains contact with the vehicle, for example, by depressing a parking or maneuvering button 16 on the transmitter. If the button is released, for example, due to the vehicle driver's inattentiveness or because the vehicle driver has dropped inadvertently the transmitter, then the parking or maneuvering operation is interrupted immediately by the parking and maneuvering device; and the vehicle is stopped automatically.

Furthermore, integrated into the parking and maneuvering device of the embodiment is a parking assistant (not illustrated), which is based, for example, on ultrasonic sensors, which are now typically used for such purposes. These parking assistants warn in the conventional manner the driver as soon as they detect an obstacle. Integrated into the solution of the invention, the parking assistant acts with this function as the super controller over the vehicle driver and the controller. The warning signal of the parking assistant is used to brake the vehicle. The integration is optional for the solution, according to the invention, and can be omitted.

To pull out of a parking space, the vehicle driver activates from outside the vehicle the parking and maneuvering device, which fixes with the aforementioned means for measuring the environment in the local map a target position, which is suitable for getting in, outside the parking space and fixes from the determined, current vehicle position a desired trajectory for the purpose of selecting this target position.

The parking and maneuvering device starts the vehicle after signaling the successful introduction of the operation to unpack the vehicle and steers it automatically, as described above for the parking operation, by traveling the determined desired trajectory to the target position. There the passengers and the vehicle driver can get into the vehicle, which must be unlocked; and the parking and maneuvering device can be deactivated.

During the unparking operation, the integrated parking assistant can also interrupt the parking operation in the event of obstacles. Here, too, there is an interruption, when there is no contact between the transmitter 15 and the controller 12, as can be the case, for example, when the activating button 16 on the transmitter 15 is released. Even during the unparking operation the additional use of the parking assistant is optional and not absolutely necessary for the solution, according to the invention.

Figure 2:
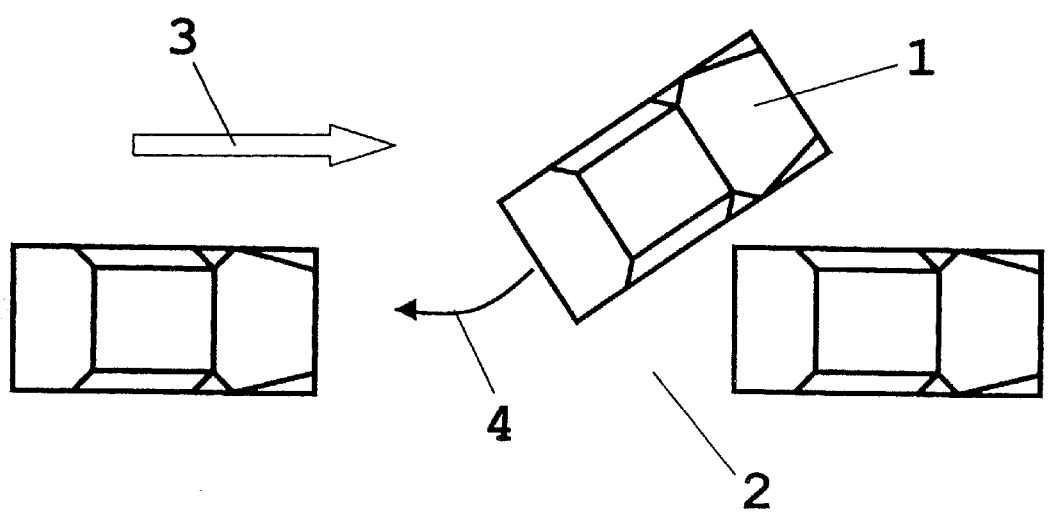
FIG. 2 shows a parking operation parallel to the direction of travel.

In the parking operation, depicted in FIG. 2, the parking vehicle 1 is parked by the vehicle driver in front of the selected parking space 2, which extends parallel to the main direction of travel 3. This parking situation occurs especially in the case of parking bays or in parking spaces, arranged in series at the edge of the road.

Optimal parking positions for this parking operation are on the side prior to the start or behind the end of the parking space, in which the vehicle 1 is standing at approximately an acute angle to the longitudinal axis of the parking space 2; and, thus, the vehicle doors can be easily opened.

Otherwise, the parking and unparking operations for such a parking space are equivalent in all features to the parking operations, described above with respect to FIG. 1.

The basic operating principle of both the illustrated embodiment and other embodiments of the invention lies in the fact that the vehicle 1 is controlled, using the on-board parking and maneuvering device. The parking and maneuvering device measures continuously the environment of the vehicle by means of a sensor system 5 and the current vehicle position by means of the position sensing device 6 and determines from them with the on-board computer 8 the control data for the parking or maneuvering. After the parking and maneuvering device on a starting position, assumed by the vehicle 1, has signaled on the display 7a the release for the parking or maneuvering operation, the vehicle driver activates with a transmitter 15 by depressing a parking or maneuvering button 16 the parking and maneuvering device from outside the vehicle. Thereupon, the parking and maneuvering device determines from the measurement values, found for the environment and the current vehicle position, the control commands for the actuators of the vehicle 1, by means of which it acts on the drive train 11 and the steering 9 of the vehicle in order to traverse the desired trajectory 4, computed on-board, in such a manner that the vehicle 1 drives automatically into the target position for parking or unparking.

In the event of danger the vehicle driver can interrupt the parking or maneuvering operation immediately by releasing the depressed parking or maneuvering button 16.

In addition, the vehicle environment can be monitored for obstacles by a parking assistant (not illustrated). In the event of a risk of a collision, the parking or maneuvering operation can be overridden and interrupted by the parking assistant.

In the event of an unsuitable parking or maneuvering situation the parking and maneuvering device can send to the vehicle driver via the display 7a information about the reason for the unsuitability.

The sensor system 5 can be designed, for example, as a laser scanner.

The device can be activated and deactivated from outside the vehicle 1 with a transmitter 15.

In summary the solution, according to the invention, is based on the fact that the vehicle driver parks the motor vehicle 1 when parking, for example, in front of a selected parking space or the garage driveway and leaves the parked vehicle before starting the parking operation. Then the vehicle driver activates with a transmitter 15 the parking and maneuvering device in the vehicle. Said parking and maneuvering device steers the vehicle completely automatically into the parking space to the planned target position by means of measured position and environment data and the control commands, calculated from said data, by way of the corresponding drive and steering actuators. Then it parks the vehicle safely in said parking space.

It is also possible with the solution of the invention to pull the vehicle out of a park position and to move it into another park position. To this end, the steering is triggered from outside the motor vehicle. Then the vehicle is driven by means of the measured position and environment data and the resulting calculated control commands by way of corresponding drive and steering actuators automatically into the planned target position.

Correspondingly it is also possible to pull automatically out of a parking space by means of the transmitter. In this situation the vehicle driver does not get into the vehicle until after said vehicle has been successfully pulled out of the parking space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A process for moving a motor vehicle into a target position, comprising:
    placing the motor vehicle in a starting position near the target position;
    following a first driver-side activation, scanning the environment of the motor vehicle continuously at least for detection of the target position, and determining continuously the current motor vehicle position;
    determining control data for moving the motor vehicle into the target position with the aid of the determined environment and position information; and after a second driver-side activation, delivering control data-dependent control commands to at least one of a drive train, a brake system and a steering system of the motor vehicle, thus driving the motor vehicle driver-independently into the target position.

2. The process of claim 1, further comprising:

recognizing the target position using at least one of the determined environment and position data, and delivering the data to a driver.

3. The process of claim 1, further comprising:

when an obstacle to the driving operation is detected while scanning the environment of the motor vehicle and while determining the current motor vehicle position, delivering at least one of warning information and information about the obstacle to a driver;

blocking the second driver-side activation;

and terminating or interrupting the driving operation.

4. The process of claim 1, further comprising:

providing a communications connection between the driver outside the motor vehicle and the motor vehicle, said connection sending at least a driver-side activation command to the motor vehicle and sending vehicle-side data to a driver.

5. The process of claim 1, wherein the target position is one of a parking space and a garage parking space, which can be determined by the environment and position data.

6. The process of claim 1, wherein the starting position is one of a parking space and a garage parking space, and the target position is a position outside the starting position.

7. A device for carrying out the process of claim 1, comprising:

an environment sensing device, disposed on the motor vehicle, the environment sensing device detecting continuously the environment of the motor vehicle and the target position;

a position sensing device, disposed on the motor vehicle, the position sensing device detecting continuously the position of the motor vehicle;

a first actuator, acting on the environment sensing device and the position sensing device, for driver-side activation of the environment sensing device and the position sensing device;

a computer connected to the environment sensing device and the position sensing device, the computer generating the control data as a function of the vehicle environment and the vehicle position for the purpose of moving the motor vehicle into the target position;

a controller connected to the at least one of the drive train, the brake system and the steering system of the motor vehicle, the controller influencing as a function of the control data the at least one of the drive train, the brake system and the steering system of the motor vehicle in such a manner that the motor vehicle is driven into the target position independently of the driver; and a second actuator in contact with the controller for driver-side activation of the controller.

8. The device of claim 7, wherein at least the first actuator is disposed on the motor vehicle.

9. The device of claim 7, further comprising:

a transmitter and a receiver connected to the controller, wherein at least the second actuator is disposed on the ransmitter, which communicates with the receiver.

10. The device of claim 7, wherein at least one of the environment sensing device and the position sensing device includes at least one of a camera arrangement, a laser scanner arrangement, an ultrasonic sensor arrangement, and a radar sensor arrangement.

11. The device of claim 7, wherein the position sensing device includes a satellite-aided GPS position recognition for recognizing the starting and target positions and the current position.

12. The device of claim 7, further comprising:

an emergency terminating mechanism disposed on at least one of the motor vehicle and the transmitter, wherein the emergency terminating mechanism is used for driver-side termination or interruption of the driving operation into the target position.

13. A device for moving a motor vehicle into a target position, comprising:

an environment sensing device that detects continuously the environment of the motor vehicle and the target position;

a position sensing device that detects continuously the position of the motor vehicle;

a first actuator connected to on the environment sensing device and the position sensing device, the first actuator being configured for driver-side activation of the environment sensing device and the position sensing device;

a computer connected to the environment sensing device and the position sensing device, the computer generating the control data as a function of the vehicle environment and the vehicle position for the purpose of moving the motor vehicle into the target position;

a controller connected to the at least one of the drive train, the brake system and the steering system of the motor vehicle, the controller influencing as a function of the control data the at least one of the drive train, the brake system and the steering system of the motor vehicle to drive the motor vehicle into the target position independently of the driver; and a second actuator in contact with the controller for driver-side activation of the controller.

14. The device of claim 13, wherein at least the first actuator is disposed on the motor vehicle.

15. The device of claim 13, further comprising:

a transmitter and a receiver connected to the controller, wherein at least the second actuator is disposed on the ransmitter, which communicates with the receiver.

16. The device of claim 13, wherein at least one of the environment sensing device and the position sensing device includes at least one of a camera arrangement, a laser scanner arrangement, an ultrasonic sensor arrangement, and a radar sensor arrangement.

17. The device of claim 13, wherein the position sensing device includes a satellite-aided GPS position recognition for recognizing the starting and target positions and the current position.

18. The device of claim 13, further comprising:

an emergency terminating mechanism disposed on at least one of the motor vehicle and the transmitter, wherein the emergency terminating mechanism is used for driver-side termination or interruption of the driving operation into the target position.

* * * * *